United States Patent
Leiser et al.

(10) Patent No.: US 7,419,251 B2
(45) Date of Patent: Sep. 2, 2008

(54) OVERMOLDED TUBE HEADER

(75) Inventors: Judson Leiser, Corvallis, OR (US);
Gary Douglas Powell, Albany, OR (US);
David N. Olsen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 10/976,671

(22) Filed: Oct. 29, 2004

(65) Prior Publication Data

US 2006/0091266 A1   May 4, 2006

(51) Int. Cl.
*B41J 2/05* (2006.01)
(52) U.S. Cl. .......................................... 347/66; 347/85
(58) Field of Classification Search .................. 347/66, 347/84–87
See application file for complete search history.

(56) References Cited

U.S. PATENT DOCUMENTS

| | | | |
|---|---|---|---|
| 3,912,003 A * | 10/1975 | Schrade | 165/165 |
| 4,036,289 A * | 7/1977 | Cheng et al. | 165/82 |
| 4,085,185 A | 4/1978 | Adair | 264/248 |
| 4,215,087 A | 7/1980 | Mathison | 264/320 |
| 4,324,755 A | 4/1982 | Bommer | 264/312 |
| 4,373,894 A | 2/1983 | Peppel | 425/343 |
| 4,589,835 A | 5/1986 | St. Amand | 425/392 |
| 5,038,455 A | 8/1991 | Guest | 29/453 |
| 5,380,050 A | 1/1995 | Sanders | 285/258 |
| 5,404,942 A * | 4/1995 | Patel | 165/179 |
| 5,482,447 A | 1/1996 | Sunden | 417/477.12 |
| 5,549,865 A | 8/1996 | Guests | 264/318 |
| 5,600,885 A | 2/1997 | Schroepfer | 29/883 |
| 6,426,031 B1 | 7/2002 | Hayes, Jr. | 264/318 |
| 6,505,389 B2 | 1/2003 | Manson | 29/421.1 |
| 6,554,929 B2 * | 4/2003 | Lee | 156/73.1 |
| D478,550 S | 8/2003 | Garver | D13/146 |
| 6,929,060 B2 * | 8/2005 | Heier | 165/173 |
| 2004/0040699 A1* | 3/2004 | Lee | 165/178 |

* cited by examiner

Primary Examiner—Juanita D Stephens

(57) ABSTRACT

A tube interconnect includes a tube and a header overmolded about the tube.

45 Claims, 4 Drawing Sheets

OVERMOLDED TUBE HEADER

BACKGROUND

Many fluid handling systems utilize one or more tubes for directing the flow of fluid, such as one or more liquids or gases. Fluid interconnection of the one or more tubes is sometimes addressed with one or more headers secured to ends of the tubes. Adequately securing such headers to the tubes is difficult and often results in leakage. Moreover, existing methods by which the header is secured to the tubes are often limited for use with tubes that are too large, too inflexible or too gas or moisture permeable.

DETAILED DESCRIPTION OF THE EXAMPLE EMBODIMENTS

Figure 1:
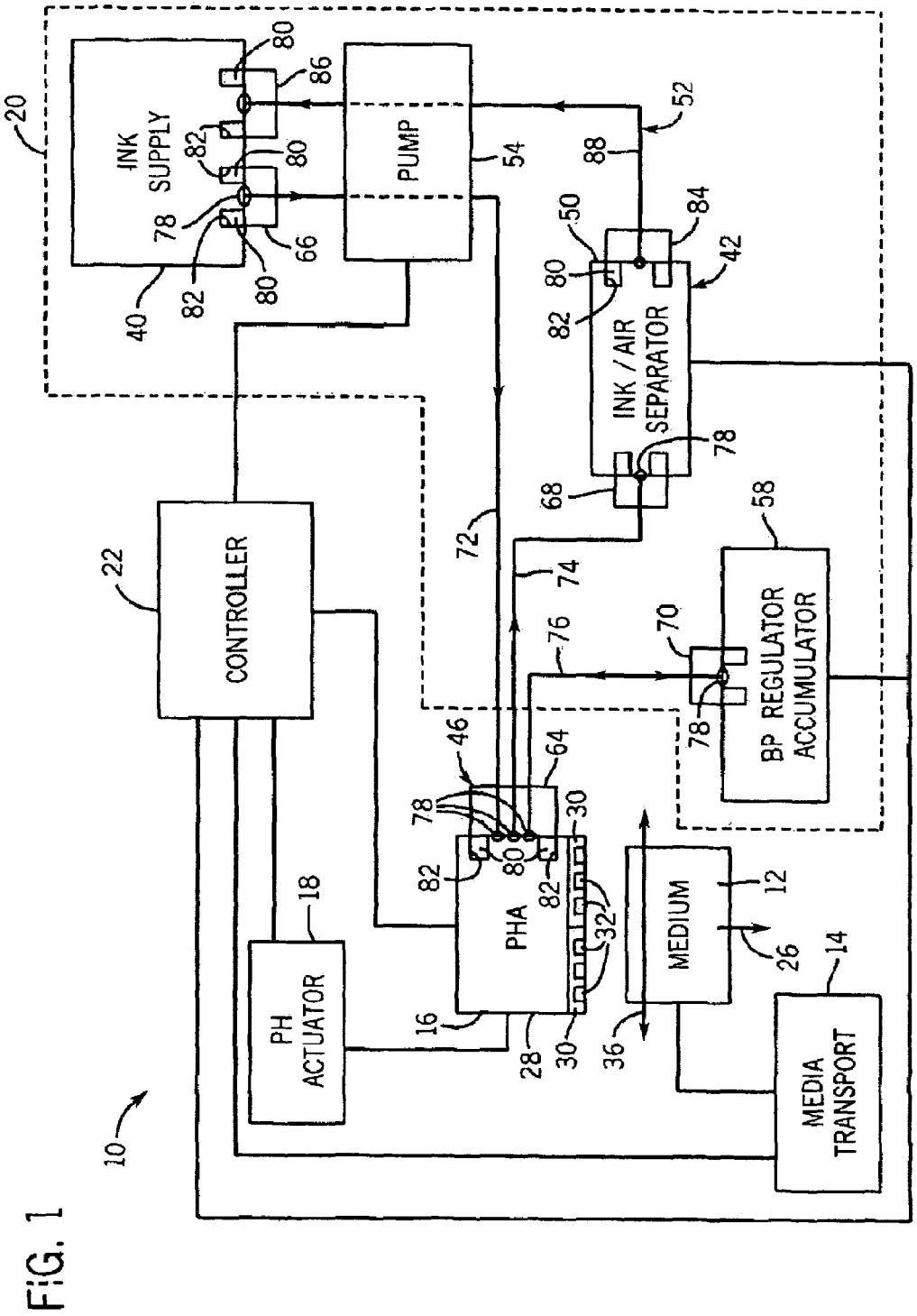
FIG. 1 is a schematic illustration of a printer including tube interconnects according to one exemplary embodiment.

FIG. 1 is a schematic illustration of printer 10 which is configured to form or print an image upon a print medium 12. Printer 10 generally includes media transport 14, printhead assembly 16, printhead actuator 18, ink supply system 20 and controller 22. Media transport 14 generally comprises one or more structures or mechanisms configured to move print medium 12 relative to printhead assembly 16. In the particular example shown, media transport 14 is configured to move medium 12 relative to printhead assembly 16 in a direction indicated by arrow 26. In one embodiment, media transport 14 may comprise a rotatably driven drum. In another embodiment, media transport 14 may comprise one or more belts or rollers which are driven to carry medium 12 relative to printhead assembly 16. In still other embodiments, other media transport mechanisms may be employed.

Printhead assembly 16 comprises a mechanism configured to deliver and deposit one or more inks upon medium 12. Printhead assembly 16 includes one or more ink reservoirs 28 and one or more printheads 30 having a plurality of nozzles 32 through which ink is ejected. Ink reservoir 28 comprises a storage chamber configured to receive and temporarily store ink received from ink supply system 20. Ink reservoir 28 is in fluid communication with and supplies ink to nozzles 32 of printheads 30. In the particular example shown, printheads 30 comprise inkjet printheads configured to selectively eject droplets of ink upon medium 12 through nozzles 32.

Printhead actuator 18 comprises a mechanism configured to transversely move printhead assembly 16 relative to medium 12 in a direction indicated by arrows 36. In one embodiment, actuator 18 may comprise a motor configured to drive a cable or belt connected to printhead assembly 16 which is slidably supported along a guide or rod so as to move printhead assembly 16 relative to medium 12. In other embodiments, actuator 18 may have other configurations.

Ink supply system 20 is configured to deliver ink to printhead assembly 16 for printing upon medium 12. In the particular example shown, ink supply system 20 is configured to recirculate ink through printhead assembly 16. Ink supply system 20 generally includes ink supply 40 and fluid delivery system 42.

Fluid delivery system 42 generally includes tube interconnect 46, pump 54, ink/air separator 50, tube interconnect 52 and back pressure regulator/accumulator 58. Tube interconnect 46 fluidly connects ink supply 40 to printhead assembly 16. In particular, tube interconnect 46 allows fluid to flow between ink supply 40 and printhead assembly 16. Tube interconnect 46 includes headers 64, 66, 68, 70 and tubes 72, 74 and 76. Header 64 comprises a structure overmolded about tubes 72, 74 and 76 so as to form a seal about tubes 72, 74 and 76. Header 64 is configured to mate with printhead assembly 16. Seals 78 extend between header 64 and printhead assembly 16 about ends of tubes 72, 74 and 76. In one embodiment, seals 78 may be coupled to header 64. In another embodiment, seals 78 may be coupled to printhead assembly 16. In still another embodiment, seals 78 may be cooperatively formed by both header 64 and printhead assembly 16.

As further shown by FIG. 1, header 64 includes an asymmetric configuration 80 which is adapted to mate with corresponding asymmetric configuration 82 of connector portion of printhead assembly 16. In the example shown, header 64 includes a male projection which is received by a corresponding female detent of printhead assembly 16. In other embodiments, this relationship may be reversed.

Because header 64 is overmolded about tubes 72, 74 and 76, header 64 provides a reliable seal about tubes 72, 74 and 76. Because header 46 is overmolded about tubes 72, 74, 76, header 64 may be molded in a variety of shapes and configurations including the exemplary asymmetric configuration of header 64 which facilitates proper alignment and connection of tubes 72, 74 and 76 with printhead assembly 16. Because header 64 operates with connector portion of printhead assembly 16 to form a seal about tubes 72, 74 and 76, the necessity of providing seals by pinching or otherwise engaging the ends of tubes 72, 74 and 76 may be eliminated.

In one embodiment, one or more of tubes 72, 74 and 76 are formed from a first polymeric material of the same polymeric family as the polymeric material chosen for header 64. As a result, during molding, header 64 fuses to the exterior surface of one or more of tubes 72, 74 and 76. In other embodiments where one or more tubes 72, 74 and 76 and header 64 are formed from distinct polymeric materials, header 64 contracts when cooling about one or more of tubes 72, 74 and 76 to seal against tubes 72, 74 and 76. Because header 64 is overmolded about tubes 72, 74 and 76, header 64 provides a single integral unitary body which maintains the relative positioning of tubes 72, 74 and 76. As a result, tubes 72, 74. 76 are less likely to become tangled, crossed or inadvertently connected to incorrect connection points of printhead assembly 16.

Headers 66, 68 and 70 are substantially identical to header 64 except that headers 66, 68 and 72 are overmolded about opposite ends of tubes 72, 74 and 76, respectively. Headers 66, 68 and 70 are further specifically configured for mating with ink supply 40, ink/air separator 50 and back pressure regulator/accumulator 58, respectively, instead of printhead assembly 16. Each of headers 66, 68 and 70 include asymmetric configurations 80 that are distinct from one another and that are configured to mate with corresponding asymmetric configurations 82 of ink supply 40, ink/air separator 50 and back pressure regulator/accumulator 58, respectively. Because asymmetric configurations 80 are distinct from one another, headers 64, 66, 68 and 70 facilitate proper connection of such headers to the connecting portions of printhead assembly 16, ink supply 40, ink/air separator 50 and back pressure regulator/accumulator 58. Like header 64, headers 66, 68 and 70 operate with connecting portions of ink supply 40, ink/air separator 50 and back pressure regulator/accumulator 58 to form seals 78 about the ends of tubes 72, 74 and 76.

Tubes 72 extend between ink supply 40 and printhead assembly 16. Tubes 72 are configured to deliver different colored inks from ink supply 40 to printhead assembly 62. In the particular embodiment shown, tubes 72 includes six tubes for delivering six differently colored inks. In the exemplary embodiment shown, tubes 72 have an outer diameter of no greater than 6 mm, a wall thickness of no greater than 2 mm, permeability of no greater than 60 gm ml/day 100" sq ($H_2O$), 1000 cc ml/day 100" sq atm ($O_2$). In one embodiment, tubes 72 are each formed from a material selected from a group of materials formed from at least one of a group of materials including polyolefin, PET, polyamide, or PTFE.

Tubes 74 extend between printhead assembly 16 and ink/air separator 50. Tubes 74 deliver or recirculate ink from printhead assembly 16 to ink/air separator 50. In other embodiments, tubes 74 may alternatively deliver ink from printhead assembly 16 to ink supply 40. In the exemplary embodiment shown, tubes 74 have an outer diameter of no greater than 6 mm, a wall thickness of no greater than 2 mm, permeability of no greater than 60 gm ml/day 100" sq ($H_2O$), 1000 cc ml/day 100" sq atm ($O_2$). In one embodiment, tubes 74 are each formed from a material selected from a group of materials formed from at least one of a group of materials including polyolefin, PET, polyamide, or PTFE.

Tube 76 extends between printhead assembly 16 and back pressure regulator/accumulator 58. Tube 76 delivers gas, such as air, to and from print assembly 16. In the exemplary embodiment shown, tubes 76 have an outer diameter of no greater than 6 mm, a wall thickness of no greater than 2 mm, permeability of no greater than 60 gm ml/day 100" sq ($H_2O$), 1000 cc ml/day 100" sq atm ($O_2$). In one embodiment, tubes 76 are each formed from a material selected from a group of materials formed from at least one of a group of materials including polyolefin, PET, polyamide, or PTFE.

Overall, tube interconnect 46 provides a reliable seal about tubes 72, 74 and 76 while organizing and maintaining the positioning of tubes 72, 74 and 76 relative to one another. As a result, tube interconnect 46 facilitates assembly of printer 10.

Ink/air separator 50 comprises a mechanism connected between tubes 74 of tube interconnect 46 and tube interconnect 52. Ink/air separator 42 receives ink from printhead assembly 16 through tubes 74 and is configured to separate entrapped air from the ink being received. The separated ink is directed by tube interconnect 52 back to ink supply 40.

Tube interconnect 52 extends between ink/air separator 50 and ink supply 40. Tube interconnect 52 includes headers 84, 86 and tubes 88. Headers 84 and 86 extend at opposite ends of tubes 88 and are configured to connect tubes 88 to ink/air separator 50 and ink supply 40, respectively. Headers 84 and 86 are each substantially identical to headers 68. Headers 84 and 86 are each overmolded about tubes 88 and include asymmetric configurations 80 configured to mate with corresponding asymmetric configurations 82 of ink/air supply 50 and ink supply 40. Asymmetric configurations 80 and headers 84 and 86 are distinct from asymmetric configurations 80 of headers 64, 66, 68 and 70 to facilitate proper connection as part of printer 10. In examples shown, asymmetric configurations 80 of header 84 is distinct from asymmetric configurations 80 of header 86. In other embodiments, asymmetric configurations 80 of one or more of headers 64, 66, 68, 70, 84 and 86 may be similar. In the particular examples shown, asymmetric configurations 80 comprise projections which are received within corresponding detents of asymmetric configurations provided by asymmetric configurations 82. In other embodiments, this relationship may be reversed.

Tubes 88 extend between ink/air separator 50 and ink supply 40 and are configured to deliver ink from ink/air separator 50 to ink supply 40. In the particular example shown, tubes 88 include six tubes for delivering six distinct colors of ink. In other embodiments in which a greater or fewer number of such colors of ink are used by printer 10, tubes 72, 74 and 88 may have a greater or fewer number of individual tubes. In the particular example shown, tubes 88 are substantially identical to tubes 74. In one embodiment, tubes 74 and 88 have an inner diameter and an outer diameter distinct from that of tubes 72. In one embodiment, tubes 74 and 88 have a greater internal diameter as compared to tubes 72.

Pump 54 comprises an actuator configured to move fluid along and through tubes 72, 74 and 88. In the particular examples shown, pump 54 comprises a peristaltic pump which mechanically interacts against tubes 72 and 88 to move fluid along inner tubes 72 and 78. In other embodiments, other pumping devices may alternatively be employed.

Back pressure regulator/accumulator 58 comprises a mechanism configured to regulate the back pressure within reservoir 28 of printhead 16. Regulator/accumulator 58 communicates with the interior of reservoir 28 of printhead 16 via tube 76 of tube interconnect 46. Regulator/accumulator 58 controls the pressure to inhibit bleeding of ink from printhead 16 through nozzles 32.

Controller 22 comprises a processing unit configured to generate control signals to direct the operation of media transport 14, printhead assembly 16, printhead actuator 18 and ink supply system 20. For the purposes of this disclosure, the term "controller" shall mean a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 22 is not limited to any specific combination of hardware circuitry and software, nor to any particular source for the instructions executed by the processing unit. In the example shown, controller 28 generates control signals which direct media transport 14 to move medium 12 in the direction indicated by arrow 26 and that which direct printhead actuator 18 to move printhead assembly 16 in the direction indicated by arrow 36. Controller 22 further generates control signals which direct the ejection of ink by printhead assembly 16, which direct the operation of pump 54 to recirculate ink between ink supply 40 and printhead assembly 16 and which direct the operation of back pressure regulator/accumulator 58 to control back pressure within printhead assembly 16. In the examples shown, controller 22 also generates control signals which direct the operation of ink/air separator 50.

Figure 2:
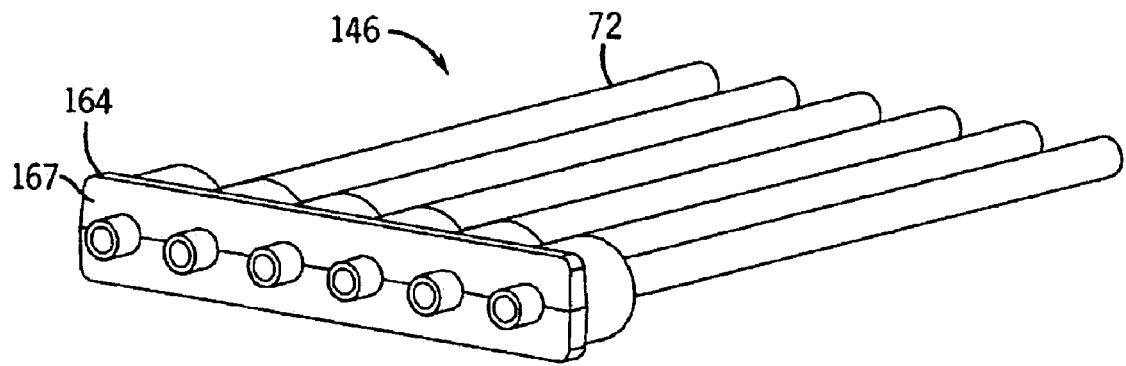
FIG. 2 is a front perspective view of one embodiment of a tube interconnect according to one exemplary embodiment.

FIG. 2 is a perspective view of tube interconnect 146, an embodiment of tube interconnect 46 shown in FIG. 1. Tube interconnect 146 is similar to tube interconnect 46 except that tube interconnect 146 includes header 164 in lieu of header 64. Header 164 is overmolded about tubes 72. In another embodiment, printer 10 may alternatively include header 164 coupled and forming a seal with printhead assembly 16. In such an embodiment, an additional header or headers (not shown) are overmolded about tubes 74 and tubes 76 and are also coupled to and form a seal with printhead assembly 16. Although tubes 72 are illustrated as projecting from face 167 of header 164, tubes 72 may alternatively terminate at face 167 or be recessed partially within header 164. As shown by FIG. 2, header 164 maintains each of tubes 72 relative to one another in a parallel arrangement and in a row. In other embodiments, header 164 may alternatively retain tubes 72 in other relative positions and in other arrangements.

Figure 3:
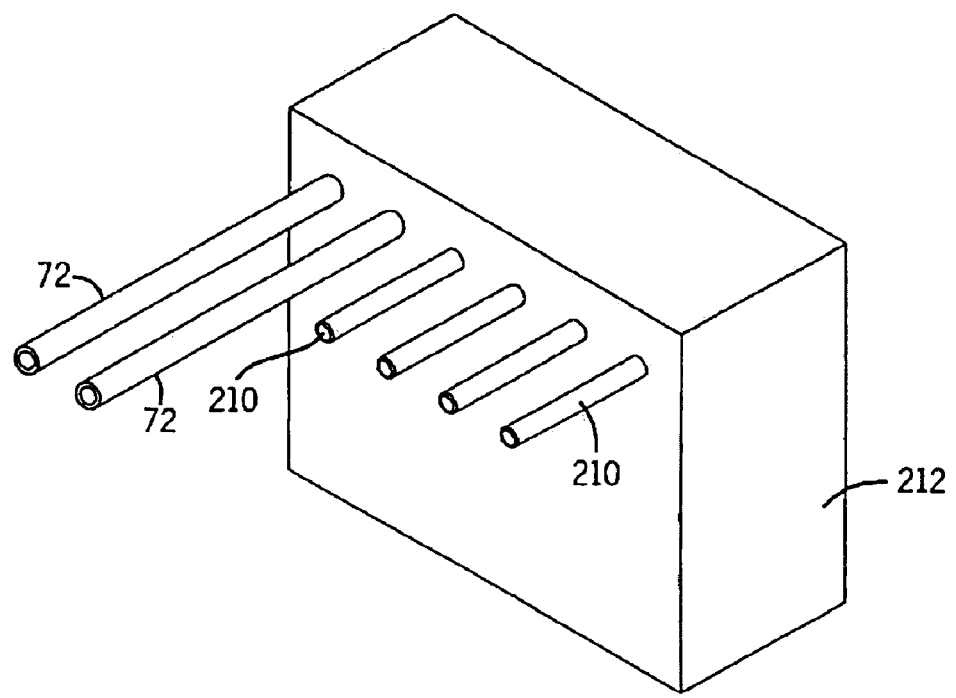
FIG. 3 is a top perspective view illustrating supports positioned within tubes according to one exemplary embodiment.
Figure 4:
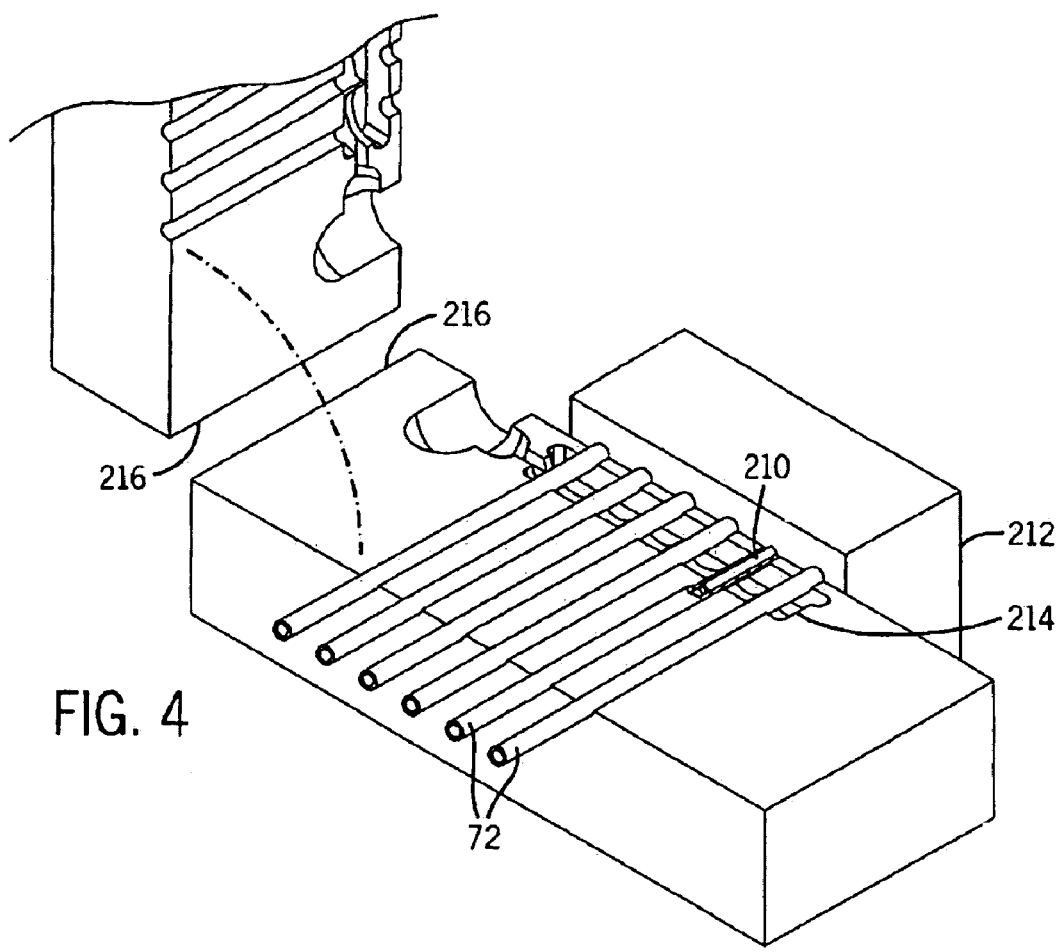
FIG. 4 is an exploded perspective view of the tubes of FIG. 3 positioned across a mold cavity according to one exemplary embodiment.
Figure 5:
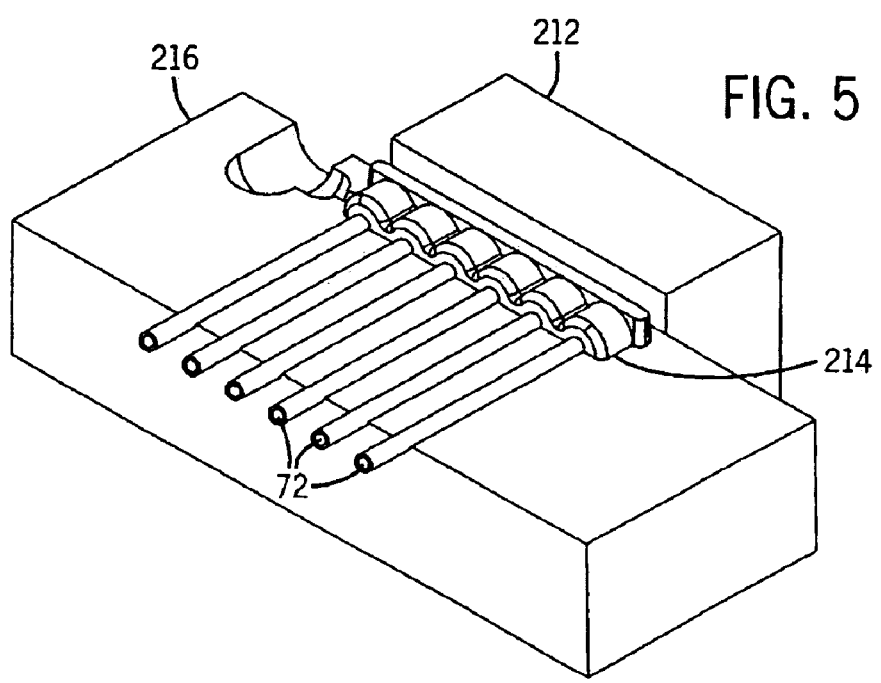
FIG. 5 is a top perspective view illustrating overmolding about the tubes according to one exemplary embodiment.

FIGS. 3-5 illustrate a method for forming tube interconnect 146. As shown by FIG. 3, a support member 210 is positioned within each of tubes 72. In the particular examples shown, support members 210 comprise rigid, elongate pins extending from a slider bar 212. Slider bar 212 enables pins 210 to be inserted into tubes 72 and to be withdrawn from tubes 72 in a single operation.

As shown by FIG. 4, tubes 72, with the inserted support members 210, positioned across cavity 214 and mold 216. Cavity 214 is generally configured to form header 164 shown in FIG. 3.

As further shown by FIG. 4, each support member 210 has a length sufficient such that support members 210 extend within their respective tubes 72 entirely across cavity 214. Support members 210 rigidify and support portions of tubes 72 within cavity 214 during the flow of polymeric material within cavity 214 and about tubes 72.

Although mold 216 is illustrated as a two-piece clamshell mold, mold 216 may comprise other kinds of molds having other configurations. Although cavity 214 is illustrated as having a specific configuration for forming header 164, cavity 214 may have various other configurations depending upon the desired configuration of header 164. Although support members 210 are illustrated as being supported by a single block or slide 212, support members 210 may alternatively be individually supported and positioned within tubes 72. Although support members 210 are illustrated as being positioned within tubes 72 prior to tubes 272 being positioned across cavity 214, tubes 72 may alternatively be positioned across cavity 214 followed by the insertion of support members 210.

As shown by FIG. 5, the polymeric material is flowed or injected into cavity 214 so as to flow through cavity 214 and about each of tubes 72. In one embodiment, the polymeric material is injected into mold cavity 214 with a relatively low injection pressure. In one exemplary embodiment, the polymeric material injected into cavity 214 with an injection pressure of less than 1,000 pounds per square inch (PSI). Because support members 210 support those portions of tube 72 extending across cavity 214 and because the polymeric material is injected into mold cavity 214 at a relatively low pressure, the polymeric material may be overmolded about tubes 72 without compromising the integrity or the positioning of tubes 72. In particular, support members 210 and the low injection pressure substantially prevent tubes 72 from being pushed and deformed, the well is possibly being severed by injected polymeric material.

According to one embodiment, at least the interior surface of tubes 72 and the material injected in the polymeric material injected into cavity 214 of the same polymeric family, resulting in the polymeric material of header 164 and tubes 72 being fusing together to form a very robust seal. In other embodiments, the exterior surface of tubes 72 and the injected polymeric material may be dissimilar, wherein the injected polymer squeezes around the tube to form a very robust seal as it cools and contracts.

Once the injected polymeric material has been allowed to sufficiently cool and solidify, support members 210 are removed and withdrawn from tubes 72 and the overmolded header 164 is further withdrawn from mold 216. Thereafter, another header 164 may be overmolded about tubes 72 at an opposite end of tubes 72. In other embodiments, header 164 may be simultaneously overmolded about both ends of tubes 72.

In the specific examples shown, tubes 72 are formed from polyethylene. Tubes 72 have an inner diameter of about 1 millimeter and an outer diameter of about 1.5 millimeters. Mold cavity 214 has a length such that header 164 is overmolded about a 4 mm length of each of tubes 72. The injected polymeric material comprises a polyolefin such as Pro-fax SR 727 supplied by Dow Chemical. The polyolefin is injected into mold cavity 214 at a pressure of between 650 PSI and 750 PSI and nominally about 700 PSI. Tubes 72 are positioned across mold cavity 214 of each tube 72 spaced from an adjacent tube by about 0.5 millimeters.

In other embodiments, the injected polymeric material as well as the polymeric material tube may comprise other polymers including both thermoplastic polymers and thermoset polymers. The relative positioning and spacing of tubes 72 across mold cavity 214 may also be varied. For example, in other embodiments, tubes 72 may be spaced from one another within mold cavity 14 by as little 0.2 millimeters. In other applications, this spacing may be set to below 0.2 millimeters. In lieu of being arranged in a row, tubes 72 will be arranged in circles, triangles or other configurations across mold cavity 214.

Overall, the overmolding process in which support members are positioned within tubes 72 and in which the one or more polymeric materials of header 164 are injected at a relatively low pressure facilitates inexpensive formation of a header about small diameter, highly flexible tubes having low permeability. The header organizes and retains such tubes relative to one another while providing a reliable and robust seal about the tubes.

Because of the resulting tube interconnect may have compactly arranged highly flexible tubes, it is well suited for use in printer 10. In particular, tube interconnect 146 enables the connector portion of printhead assembly 16 to be reduced in size. In addition, the highly flexible nature of tubes 72 are less likely to comprise the accuracy at which actuator 18 may position printhead assembly 16 relative to medium 12. In addition to being well suited for delivering fluid inks in printers, tube interconnect 146 is also well suited for use in a variety of other applications in which fluids, such as liquids or gases, must be delivered or guided using one or more tubes.

Figure 6:
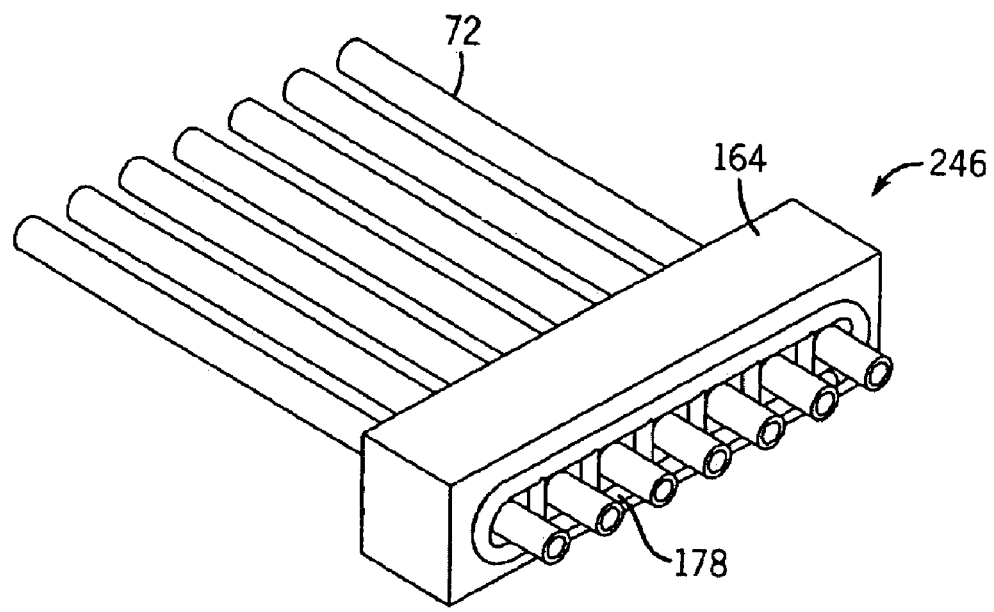
FIG. 6 is a top perspective view of another embodiment of the tube interconnect of FIG. 2 according to one exemplary embodiment.

FIG. 6 illustrates tube interconnect 246, another embodiment of tube interconnect 146. Tube interconnect 246 is similar to tube interconnect 146 except that tube interconnect 246 additionally includes seal 178. Seal 178 comprises a flexible elastomeric or compressible gasket adhered to header 164 about each of tubes 72. In the embodiment shown, seal 178 is bonded to header 164. In other embodiments, seal 178 may be mechanically retained relative to header 164. Seal 178 cooperates with opposite surfaces of an opposite connector (not shown) such as a connector portion of printhead assembly 16, to form individual seals about the ends of each of tubes 72. As a result, fluid delivered by each of tubes 72 is not mixed.

Figure 7:
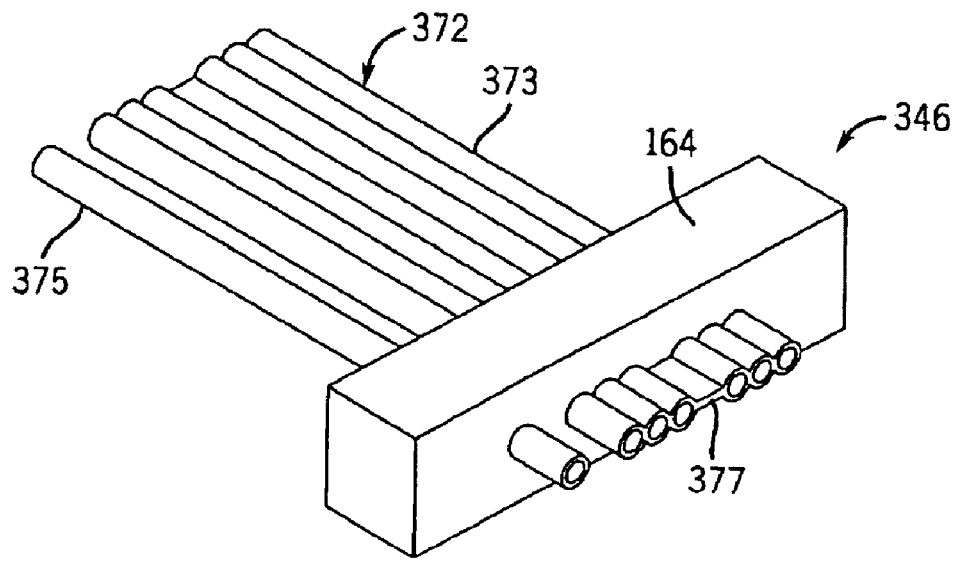
FIG. 7 is a top perspective view of another embodiment of the tube interconnect of FIG. 2 according to one exemplary embodiment.

FIG. 7 illustrates tube interconnect 346, another embodiment of tube interconnect 146, Tube interconnect 346 is similar to tube interconnect 146 except that tube interconnect 346 has header 164 overmolded about tubes 372. Tubes 372 include set 373 of six tubes which are integrally formed as part of a unitary body and individual tube 375. Tubes of set 373 are formed as a ribbon including two subsets of three tubes. The tubes of each subset are joined to one another along their sidewalls. The two subsets are joined by an intermediate flange or rib 377. In one embodiment in which tube interconnect 346 is employed in printer 10, tubes 373 deliver fluid to either ink/air separator 50 or ink supply 40 while tube 375 delivers air between printhead assembly 16 and back pressure regulator/accumulator 58. In other embodiments, tubes 373 and tube 375 may be utilized for delivering a fluid between other components of a printer or another mechanism.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A tube interconnect comprising:
    a first tube; and
    a first header overmolded about the first tube proximate a first end, wherein the first tube has an exterior surface formed from a first material, wherein the first header has a header surface adjacent the first tube formed from a second material and wherein the header surface is contracted against the exterior surface as a result of cooling of the second distinct material.
2. The interconnect of claim 1, wherein the header is fused to the first tube.
3. The interconnect of claim 1, wherein the first material and the second material are of a common polymer family.
4. The interconnect of claim 1, wherein the first tube has a permeability of no greater than 60 gm ml/day 100" sq ($H_2O$), 1000 cc ml/day 100" sq atm ($O_2$).
5. The interconnect of claim 1, wherein the first tube has an outer diameter of no greater than 6 mm.
6. The tube of claim 5, wherein the first tube has a wall thickness of no greater than 2 mm.
7. The interconnect of claim 1, wherein the first tube has a wall thickness of no greater than 2 mm.
8. The interconnect of claim 1, wherein the first tube is formed from at least one of a group of materials including:
    polyethylene, Teflon, polyolefin, PET, polyamide, or PTFE.
9. The interconnect of claim 1, wherein the first header is formed from at least one of a group of materials including:
    polyethylene, polyolefin, PET, polyamide.
10. The interconnect of claim 1, wherein the first header has a first asymmetric configuration adapted to mate with a second asymmetric configuration of a connector.
11. The interconnect of claim 1, wherein the first header projects at least one-eighth of an inch from the first tube.
12. The interconnect of claim 1, wherein the first header is formed from a material having a melt flow rate of at least 27 grams/10 minutes per ASTMD 1238.
13. The interconnect of claim 1 including a second tube, wherein the first header is overmolded about the second tube and retains the first tube relative to the second tube.
14. The tube interconnect of claim 13, wherein the first tube has a first internal diameter and wherein the second tube has a second larger internal diameter.
15. The tube interconnect of claim 13, wherein the first header maintains the first tube parallel to the second tube.
16. The interconnect of claim 13, wherein an exterior of the first tube is spaced from an exterior of the second tube by a distance no greater than 20 mm.
17. The interconnect of claim 13 including a third tube, wherein the first header is overmolded about the third tube and retains the first tube, the second tube and the third tube relative to one another.
18. The interconnect of claim 17, wherein the first tube, the second tube and the third tube are arranged in a row.
19. The interconnect of claim 13, wherein the first tube and the second tube are integrally formed as part of a single unitary body.
20. The interconnect of claim 1 including a seal coupled to the first header about an end of the first tube.
21. The interconnect of claim 1 including a second header overmolded about the first tube proximate a second end.
22. The interconnect of claim 21, wherein the first header and the second header have distinct configurations.
23. The interconnect of claim 1 including a second header overmolded about the first tube proximate a second end.
24. The interconnect of claim 23, wherein the first header and the second header have distinct configurations.
25. A tube interconnect comprising:
    a first tube;
    a first header overmolded about the first tube proximate a first end; and
    a seal coupled to the first header about an end of the first tube.
26. The interconnect of claim 25, wherein the header is fused to the first tube.
27. The interconnect of claim 25, wherein the first tube has an exterior surface formed from first material, wherein the first header is formed from a second material and wherein the first material and the second material are of a common polymer family.
28. The interconnect of claim 25, wherein the first tube has a permeability of no greater than 60 gm ml/day 100" sq ($H_2O$), 1000 cc ml/day 100" sq atm ($O_2$).
29. The interconnect of claim 25, wherein the first tube has an outer diameter of no greater than 6 mm.
30. The tube of claim 29, wherein the first tube has a wall thickness of no greater than 2 mm.
31. The interconnect of claim 25, wherein the first tube has a wall thickness of no greater than 2 mm.
32. The interconnect of claim 25, wherein the first tube is formed from at least one of a group of materials including:
    polyethylene, Teflon, polyolefin, PET, polyamide, or PTFE.
33. The interconnect of claim 25, wherein the first header is formed from at least one of a group of materials including:
    polyethylene, polyolefin, PET, polyamide.
34. The interconnect of claim 25, wherein the first header has a first asymmetric configuration adapted to mate with a second asymmetric configuration of a connector.
35. The interconnect of claim 25, wherein the first header projects at least one-eighth of an inch from the first tube.

36. The interconnect of claim 25, wherein the first header is formed from a material having a melt flow rate of at least 27 grams/10 minutes per ASTMD 1238.

37. The interconnect of claim 25 including a second tube, wherein the first header is overmolded about the second tube and retains the first tube relative to the second tube.

38. The tube interconnect of claim 37, wherein the first tube has a first internal diameter and wherein the second tube has a second larger internal diameter.

39. The tube interconnect of claim 37, wherein the first header maintains the first tube parallel to the second tube.

40. The interconnect of claim 37, wherein an exterior of the first tube is spaced from an exterior of the second tube by a distance no greater than 20 mm.

41. The interconnect of claim 37 including a third tube, wherein the first header is overmolded about the third tube and retains the first tube, the second tube and the third tube relative to one another.

42. The interconnect of claim 41, wherein the first tube, the second tube and the third tube are arranged in a row.

43. The interconnect of claim 37, wherein the first tube and the second tube are integrally formed as part of a single unitary body.

44. A tube interconnect comprising:
    a first tube;
    a first header overmolded about the first tube proximate a first end, wherein the first tube has a permeability of no greater than 60 gm ml/day 100" sq ($H_2O$), 1000 cc ml/day 100" sq atm ($O_2$).

45. A tube interconnect comprising:
    a first tube;
    a first header overmolded about the first tube proximate a first end, wherein the first header is formed from a material having a melt flow rate of at least 27 grams/10 minutes per ASTMD 1238.

* * * * *